(No Model.)
H. M. ROSE.
DISK CULTIVATOR.
No. 396,895. Patented Jan. 29, 1889.
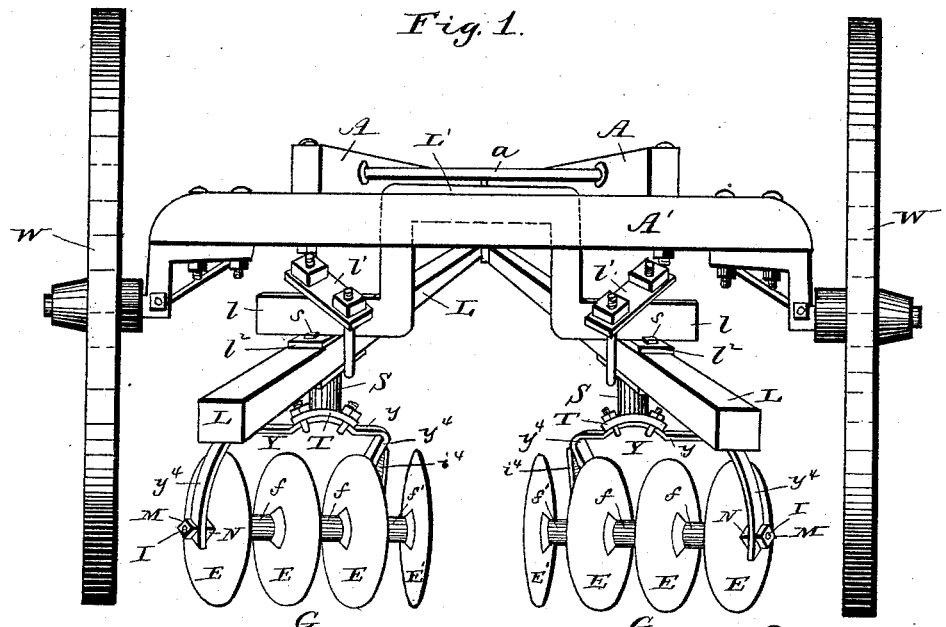
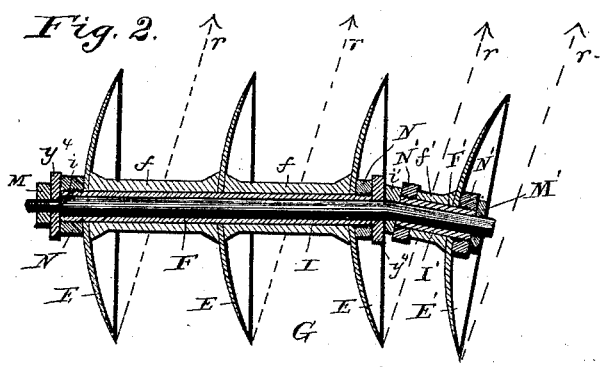
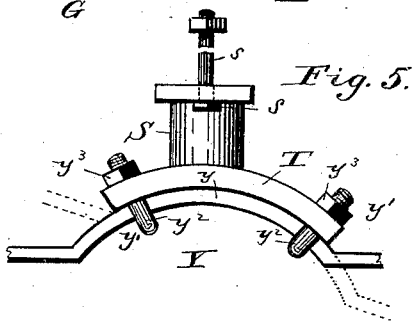
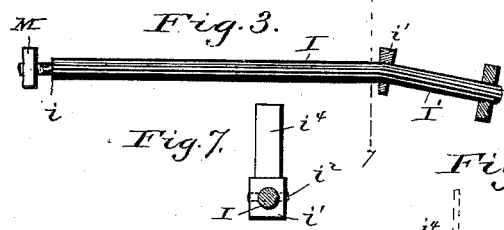
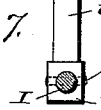
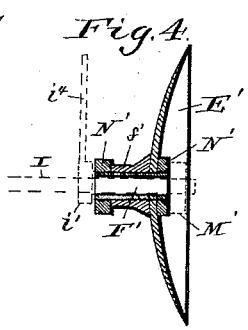
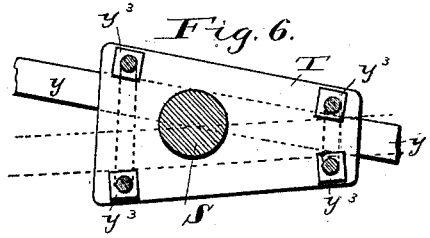
Witnesses:
E. K. Sturtevant.
D. H. Curry.
Inventor:—
H. M. Rose
by N. N. Low
attorney

UNITED STATES PATENT OFFICE.

HENRY M. ROSE, OF WATERMAN, ILLINOIS.

DISK CULTIVATOR.

SPECIFICATION forming part of Letters Patent No. 396,895, dated January 29, 1889.

Application filed September 7, 1888. Serial No. 284,806. (No model.)

*To all whom it may concern:*

Be it known that I, HENRY M. ROSE, a citizen of the United States, residing at Waterman, in the county of De Kalb and State of Illinois, have invented certain new and useful Improvements in Disk Cultivators; and I do declare the following to be a full, clear, and exact description of the invention, such as will enable others skilled in the art to which it appertains to make and use the same.

In the employment of disk and other cultivators much difficulty has been experienced in obtaining an efficient disintegration and stirring of the soil in immediate proximity to the plants without at the same time injuring the latter.

It is the object of my invention to obtain this desired degree or character of cultivation, and thereby to cause a growth and development of the plant much beyond that which is attained by the ordinary cultivator.

My invention also secures other advantages in the construction and means of adjustment of certain parts of the cultivator, as hereinafter particularly pointed out.

The invention relates to the arrangement of the disks of the gang relative to each other, whereby the inner disk or disks will be set at an angle to the outer disk or disks, and will advance in a position more nearly parallel with and at a less angle to the row of plants being cultivated than will the outer disk or disks of the gang. Under this arrangement the cutting-edge of the inner disk of one gang can be brought very close to—say within seven inches, or thereabout—the cutting-edge of the inner disk of the opposite gang, thereby insuring an efficient cutting and stirring of the soil close to the plant on each side, and yet avoiding injury to it by heaping too much soil upon it or by cutting or bruising its leaves or stalk. In this manner I attain a maximum degree of cultivation and productiveness.

The invention also consists in certain combinations of parts hereinafter set forth.

In order to make my invention understood, I have shown in the accompanying drawings a means for carrying it into effect.

In said drawings, Figure 1 is a rear view of a disk cultivator embodying my invention. Fig. 2 is a horizontal section on line 2 2, Fig. 1. Fig. 3 is a plan view of the gang-shaft detached. Fig. 4 is a sectional view of one of the inner disks and its supporting-sleeve. Fig. 5 is a rear view of the gang standard and arch. Fig. 6 is a horizontal section of the same on line 6 6, Fig. 5. Fig. 7 is a sectional view on line 7 7, Fig. 3.

Referring to the drawings, A represents the converging beams of the tongue, connected at their rear ends by the brace-rod $a$ and secured to the axle-tree A'. The latter is mounted in any suitable manner upon the wheels W, so as to be at a considerable height above the ground, as shown in Fig. 1.

L L are the drag-beams, of any preferred construction, preferably converging at their forward ends, as shown, and there connected with the tongue or draft-frame in a well-known manner. At their rear ends the drag-beams are spaced and held apart by the usual arch, L', the horizontal arms $l$ of which are secured to said beams by clamps $l'$. By these clamps the beams L and the gangs carried thereby may be adjusted farther apart or nearer together, as may be desired, the clamps being for this purpose moved inward or outward along arms $l$ and tightened up at the proper points. Plates $l^2$, secured to the upper sides of the beams, protect them and serve as a bearing-surface for arms $l$.

S S indicate the gang-standards secured to beams L, preferably bolted to the under side thereof by bolts $s$, as shown, and included, also, by clamps $l'$, if desired. The gang-standards are provided with arches T, Figs. 5 and 6, which may be advantageously formed by being cast in one piece with the standards. To the curves of said arches are conformed the curves of the transverse portions $y$ of the gang-yokes Y and clamps $y'$ are provided, consisting, for example, of staples $y^2$, adapted to be passed through or around the arches T, and having nuts $y^3$ on their screw-threaded ends, by which clamps the arches $y$ may be secured in various positions relative to arches T. The gang-yoke Y may thus be adjusted, as will be readily understood by reference to Fig. 5, so that the gangs may conform to the slopes of the ridge which will ordinarily be formed along the row of plants, and each disk cut to the same depth. By this means of adjustment the cultivator may also be adapted to other conformations of ground, as may be desired.

Usually the standards S will be secured to beams L in such position that the gangs will have the proper average inclination or angle to the line of advance. Such angle may, however, be obtained by the means of adjustment shown best in Fig. 6, or by other equivalent means, by which the gangs may be swung in horizontal planes and clamped when at the desired angle. My clamping device consists of the staples $y^2$, already referred to, one or both of which are made of sufficient width to permit a forward or backward adjustment of the ends of arches $y$ on arches T, as indicated in dotted lines in Fig. 6. I deem it preferable to originally set the standards S so that the gangs will have the average desired inclination and to modify such angle as circumstances may require by means of the clamping devices.

The gangs G are carried by the arms $y^1$ of the gang-yokes Y in the usual manner. The disks E of the outer and main portion of the gang are mounted upon a sleeve, F, are spaced by collars or thimbles $f$, and are clamped rigidly between nuts N, which screw upon the outer and inner ends of said hollow sleeve or shaft F.

I is a stationary shaft or journal passing through the sleeve F, mounted in the ends of arms $y^1$, and firmly clamped in place at its outer end by a nut, M, which screws upon its reduced and threaded end and serves to draw its shoulder $i$ tightly against the inner face of the outer of arms $y^1$. It is evident, however, that other means may be employed for securing shaft I in place. Upon this stationary shaft the sleeve F and disks E turn freely when the cultivator is in operation. It will, however, be understood that other well-known means for mounting the gang-disks so that they will freely rotate may be employed. For the mounting of the inner disk of the gang, a second journal, I', is provided. This I prefer to form in one piece with and as a continuation of the shaft I, though at an angle thereto. While more than one disk may be employed for this inner portion of the gang, I prefer to use but one, and have illustrated such latter construction.

The inner disk is shown at E', and is preferably provided with a sleeve, F', thimble $f''$, and clamping-nuts N'. By means of said sleeve it is mounted upon the second journal, I', so as to freely rotate thereon when in use, being held upon the journal by the nut M' or equivalent fastening.

When journals I and I' are formed together, as shown, I prefer to separate them by the flange or collar $i'$, Fig. 3, which surrounds them at their juncture and is rigidly secured in place by being shrunk on or by a pin, as shown at $i^2$.

It will now be seen that the parts being in the position shown in Fig. 2, in which the dotted arrows $r$ indicate the direction of the line of advance, the inner disk, E', may travel very closely to the row of plants, cutting and disintegrating the soil in immediate proximity to them without unduly heaping up the earth upon their stalks or otherwise inflicting injury, while the main portion of the gang, set at a different and greater angle, will operate in the usual manner, turning and throwing the earth and cutting the weeds to a greater extent than would be safe for the inner disk in its close proximity to the plant.

It may often be desirable to change the angle and depth of cut of the inner disk relative to the outer portion of the gang. I have provided for conveniently effecting this in the construction shown by means of a lever, $i^4$, secured to the journals I I', preferably to the flange or collar $i'$, Figs. 4 and 7. By oscillating this lever the shaft I will be turned. Such oscillation may be caused by the toe of the driver, or a suitable lever may be employed. I have found that the friction of the parts M $y^1$ will be ordinarily sufficient to hold shaft I in the position to which it may be turned without applying any catch or holder to the lever $i^4$.

It will be understood that in place of staples $y^2$ an equivalent fastening may be used consisting of simple bolts passing through longitudinal slots in part $y$ and through transverse slots in part T, thus enabling both of the adjustments hereinbefore described to be obtained.

Yokes or supports Y may be attached to the thimbles $f f'$, if preferred.

Having thus described my invention, what I claim is—

1. A disk cultivator having the inner disks of the gangs set at a different angle to the line of advance from that of the other disks of the gangs, substantially as set forth.

2. In a disk cultivator, the gangs G, having the disks E of the outer or main portion set at an angle to the line of advance and the disk E' at the inner end of the gang set at a less angle to the line of advance, substantially as set forth.

3. The combination, with the gang-yoke or support, of a shaft or journal mounted therein for the outer portion of the gang, a second journal at an angle to the first for the inner disk of the gang, and the disks mounted on said journals, substantially as set forth.

4. In a gang for disk cultivators, the combination, with the outer disks, E, and the inner disk, E', of the part I I', forming two journals at an angle to each other for said disks, substantially as set forth.

5. The combination, with the gang, of the arched gang-yoke or support and the arch T, supported by the main frame, and clamps for adjusting the gang and securing it in vertical planes, substantially as set forth.

6. The combination, with the gang, of the arched gang yoke or support, the arch T, carried by the main frame, and clamps for securing said arches together, said clamps being also constructed to permit of the swinging of the gang-yoke for adjustment in horizontal planes and to secure said yoke to the arch T with the gang at the desired angle to the line of draft, substantially as set forth.

In testimony whereof I affix my signature in the presence of two witnesses.

HENRY M. ROSE.

Witnesses:
H. N. LOW,
GEO. L. ROSE.